Dec. 5, 1944.   C. S. ASH   2,364,183
DUAL WHEEL ASSEMBLY
Filed July 23, 1942   3 Sheets-Sheet 1

Fig. 1.

INVENTOR
Charles S. Ash
BY
ATTORNEY

Dec. 5, 1944.  C. S. ASH  2,364,183

DUAL WHEEL ASSEMBLY

Filed July 23, 1942  3 Sheets-Sheet 2

INVENTOR
Charles S. Ash
BY
ATTORNEY

Dec. 5, 1944.                C. S. ASH                2,364,183
                         DUAL WHEEL ASSEMBLY
                       Filed July 23, 1942         3 Sheets-Sheet 3

INVENTOR
Charles S. Ash.
BY
Holbert M. Dunham
ATTORNEY

Patented Dec. 5, 1944

2,364,183

UNITED STATES PATENT OFFICE 2,364,183

DUAL WHEEL ASSEMBLY

Charles S. Ash, Milford, Mich.

Application July 23, 1942, Serial No. 452,004

8 Claims. (Cl. 280—96.1)

The present invention relates to dual wheel assemblies for automotive vehicles and more particularly to novel and improved dual wheel assemblies in which the wheels are independently rotatable.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Fig. 1 is a vertical sectional view showing a typical and illustrative embodiment of the present invention;

Figure 2:
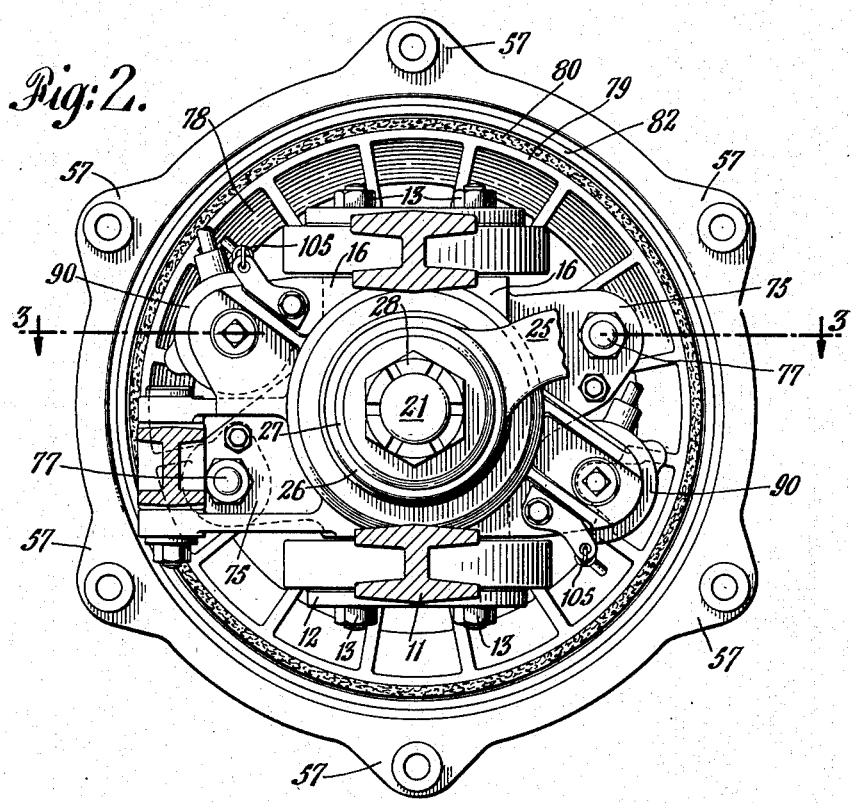
Fig. 2 is a sectional view taken along line 2—2 of Fig. 1.

The present invention has for an object the provision of novel and improved bearing means for a dual wheel assembly in which the two wheels of the assembly are each rotatable independently of the other. A further object is the provision of an improved independently rotatable dual wheel assembly in which the wheels are mounted for dirigible movement for use at the front or steering end of the vehicle. Still another object is the provision of such an assembly in which greater stability is afforded and providing adequate and safer bearings for the wheels of the assembly. The invention further provides a simpler, more compact and sturdier structure for independently rotatable dual wheel assemblies, and bearings for such assemblies which are adequate, safe and of relatively small diameter. Another object is the provision of improved brakes for independently rotatable dual wheel assemblies and improved means for the protection of the brakes.

In accordance with a typical embodiment of the invention, illustrated as applied to dirigible dual wheels, a supporting member or sleeve is mounted on a vertical pivot at the end of the front axle of a vehicle for dirigible movement with respect to the vehicle. A spindle is positioned within the sleeve and firmly secured to the end thereof nearer the vehicle axle, the spindle extending axially the length of the sleeve and beyond the other end. Two pairs of spaced apart bearings are provided on the spindle, one pair lying within the sleeve with one bearing spaced to either side of the vertical axis of the dirigible pivot of the sleeve. The other pair of bearings is mounted on the outer end of the spindle extending beyond the end of the sleeve, and the inner bearing of this pair is positioned side by side with respect to the outer bearing of the inner pair.

A wheel hub is journalled on the outer pair of bearings for free rotation about the spindle, and carries the outer web wheel of the pair of dual wheels of the assembly. Another wheel hub is rotatably mounted on the inner pair of bearings, and this hub has an axially extending portion at its outer end which overlaps an adjacent portion of the outer wheel hub and is journalled thereon, the outer surface of the outer wheel hub being finished at this portion to form a journal bearing between the two hubs. The inner web wheel is mounted on the inner hub at the journal bearing between the hubs, and this wheel is deeply dished to extend inwardly beyond the vertical axis of the dirigible pivot for the sleeve. Each web wheel is provided at its outer periphery with suitable spoke members for the attachment of pneumatic tire carrying rims.

Brakes are provided for exerting a retarding effort on each wheel, and as illustratively shown comprise a brake anchor member fixed to the supporting member or sleeve, which carries an axially movable brake shoe of frustoconical form to be forced into frictional engagement with a frustoconical brake drum on the inner side of the inner wheel. This brake drum is held against rotation with respect to the inner wheel but is axially movable, and connects through the wheel to a second axially movable frustoconical brake drum which is positioned between the inner and outer wheels. The second brake drum is axially engageable with a frustoconical portion of the outer web wheel. Means are provided for axially moving the first brake shoe into engagement with the first brake drum, whereby that drum is axially moved to force the second brake drum into engagement with the frustoconical portion of the outer wheel, whereby braking effort is exerted upon the individual wheels of the assembly.

The outer wheel web radially beyond its portion formed into the frustoconical brake drum is inwardly dished so that the outer periphery of the wheel lies closely adjacent a portion of the inner wheel, and a circular sealing member is located between the wheels for sealing off the space between the web wheels and preventing the access of dirt and weather to the outer wheel brakes and the bearings located there.

It will be understood that the foregoing general description and the following detailed description as well are exemplary and explanatory of the invention but are not restrictive thereof.

Referring now in detail to the accompanying drawings illustrating the preferred embodiment of the invention, and suitable for use as the dirigible front wheels of a heavy-duty truck or tractor, there is provided a front axle 10 of conventional form at each end of which is provided a yoke 11. A cap member 12 is secured to the top and bottom arm of yoke 11 by means of bolts 13, and these caps contain the roller bearings 14 for the pivotal mounting of a supporting member or sleeve 16, the axially aligned king pins 17 forming integral parts of the sleeve being seated in the bearings 14. Lubricant retaining washers 18 are provided for retaining lubricant within and excluding dust from the bearings 14.

The sleeve 16 has a reduced and tapered end portion 20 into which a spindle 21 is fitted at its correspondingly tapered end 22, and relative rotation is prohibited by keys 23 on the tapered end 20 of the sleeve which fit into axially extending grooves in the spindle end 22. A steering arm 25 is provided for controlling dirigible movement of the sleeve 16 and spindle 21, and this arm has a cylindrical and internally tapered member 26 integral with one end to be tightly fitted over the tapered end portion 20. The correspondingly tapered members 22, 20 and 26 are securely held in their assembled position by means of washer 27 to engage member 26 and a castellated nut 28 on the end of spindle 21.

As illustrated, a pair of roller bearings are provided on suitable seats on the portion of the spindle 21 within sleeve 16, and these bearings are spaced apart to minimize the radial loading of the bearings, the inner bearing 30 being positioned adjacent the reduced end 20 of sleeve 16 while the other bearing 31 is positioned on the central portion of the spindle, the bearings thus lying on either side of the axis of king pins 17. Another pair of spaced apart roller bearings 32, 33 are provided on the end of spindle 21 extending out of sleeve 16, and of this pair the bearing 32 is positioned against bearing 31 of the first pair, while the bearing 31 is located substantially on the end of the spindle.

The wheel hub 35 for the outer wheel of the pair of dual wheels of the assembly is rotatably mounted upon the outer pair of bearings 32, 33, the bearings seating against annular shoulders 36, 37 to hold the bearing against axial movement. The hub 38 for the inner wheel is rotatably mounted upon the inner pair of bearings 30, 31, the bearings seating against annular shoulders 40, 41 respectively in the bore of the hub. The inner wheel hub 38 is provided with an extension 43 at its outer end which overlaps a substantial portion of wheel hub 35 at its inner end, and the hubs at these overlapping ends are cooperatingly finished to furnish a radial bearing between the two, a cylindrical anti-friction bushing 44 being positioned between the two.

A lubricant retaining washer 45 is positioned between sleeve 16 and hub 38, and another such washer 46 between hub extension 43 and hub 35, and these washers serve to retain lubricant about the bearings and to exclude dust and moisture. A castellated nut 47 and washer 48 on the outer end of spindle 21 hold the bearing and hub assembly in place, and a cap 49 may be secured over the outer end by cap screws 50.

The inner wheel 55 of the dual wheel assembly is secured integrally to its hub 38 at the extended overlapping portion 43, and the wheel is deeply inwardly dished near its outer periphery to form the cylindrical portion 56. This portion of the wheel extends inwardly beyond the vertical axis of king pins 17 and has the spokes 57 upon which pneumatic tire carrying rims 58 are to be mounted in any suitable and conventional manner, as by lugs 59 and bolts 60.

The outer wheel 62 is formed integral with its hub 35 at the outer end thereof and is somewhat inwardly dished at a cylindrical portion 63 to bring it closely adjacent to and slightly overlap the inner wheel 55. A washer 65 is positioned in a groove in the inner wheel 55 and engages the cylindrical portion 63, whereby the space between the wheels is effectively sealed off but independent rotation of the wheels is hampered in no substantial degree. The outer wheel is provided with spokes 67 upon which tire rim 68, a duplicate of rim 58, is mounted by means of lugs 69 and bolts 70.

It may be seen that the wheels 55 and 62 are each mounted for independent relative rotation by individual bearings upon the spindle 21, and that a reinforced radial bearing is provided at the point where the inner wheel rests on its hub, by overlapping of the two wheel hubs. The inner wheel 55 is deeply dished so that the king pin axis falls between the road engaging portions of the wheels for easier dirigible movement, and the road engaging portion of the inner wheel is also in substantial vertical alignment with the inner hub bearings on the spindle.

While various forms of brakes may optionally be used with the dual wheels of the present invention, they are preferably of the general form and construction shown in the accompanying drawings, and more completely described and shown in my copending application, Serial No. 428,540, now Patent No. 2,331,159, dated October 5, 1943.

Figure 3:
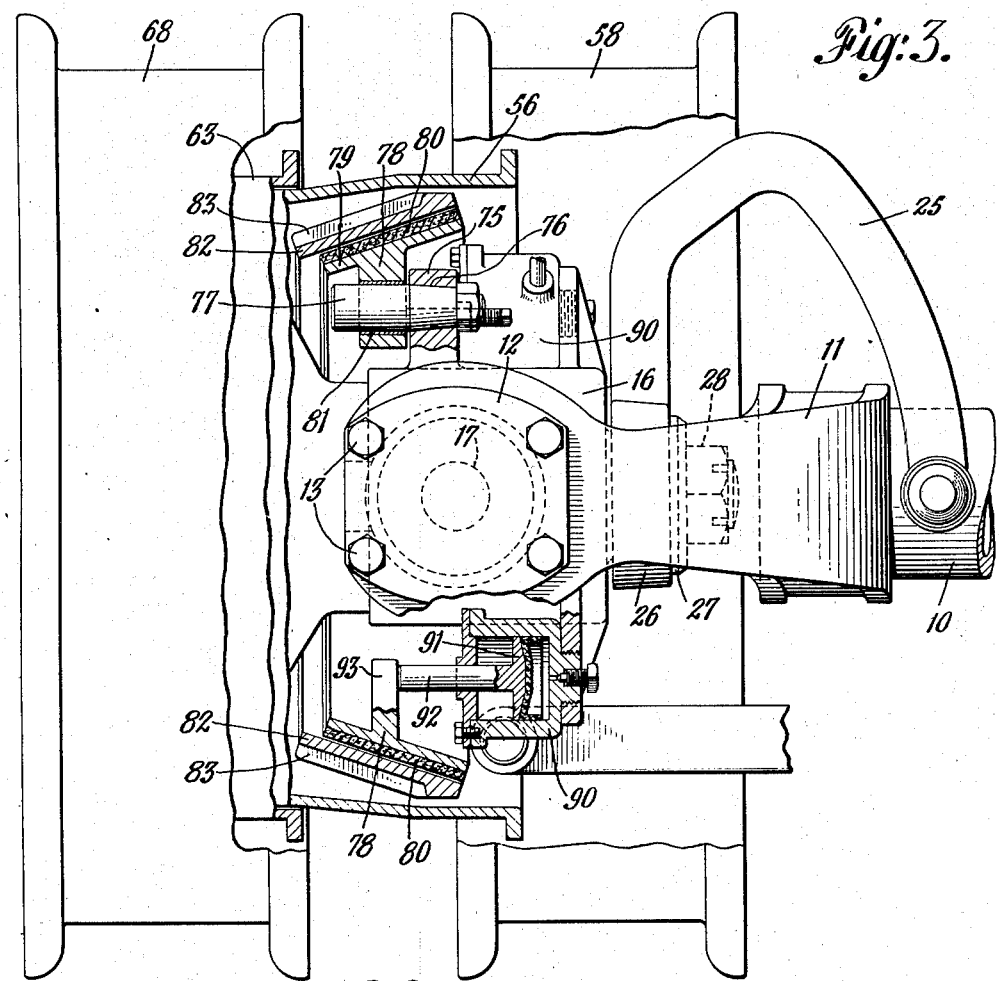
Fig. 3 is a sectional view taken along line 3—3 of Fig. 2.

The supporting member or sleeve 16 is provided at its outer end with a radially extending brake anchor portion 75 (Fig. 3) which clears the upper and lower arms of yoke 11. A plurality of tapered, axially extending apertures 76 are formed in the brake anchor portion, preferably at a uniform distance from the axis of the spindle, and in these are seated and bolted the plurality of guide rods 77. The brake shoe 78 comprises a frustoconical member 79, the outer face of which is covered with moulded brake lining 80, and the shoe is provided with a plurality of bushed apertures 81 to receive the guide rods 77, thereby permitting only axial movement of the brake shoe 78.

The brake drum for the inner wheel comprises a correspondingly tapered frustoconical member 82 having a finished inner surface and provided on its exterior with strengthening ribs 83, as well as with sockets 84 in which are received the axially extending, evenly spaced guide rods 85 which are slidable in the bushed apertures 86 formed in the web of the inner wheel 55. The brake drum 82 may thus move towards the inner wheel 55 but is always maintained coaxial with the brake shoe 78 and a full contact is obtained between the brake shoe and drum when the two are moved relatively towards each other.

Means are provided for actuating the brake and comprises the hydraulic cylinder 90 which is mounted on the supporting member or sleeve 16. Within the cylinder 90 is a piston 91 connected to the piston rod 92 which bears against a radially inwardly extending arm 93 of brake shoe 78 so that application of hydraulic pressure to piston 90 forces the brake shoe 78 axially outwards to engage it with the brake drum 82. A plurality of the hydraulic cylinders may be provided and are preferably arranged symmetrically so as to distribute the braking pressure uniformly.

Means are also provided for transferring the braking pressure to the outer wheel and for braking the outer wheel. As embodied, the outer wheel brake comprises a frustoconical brake drum 95 mounted at and by the outer ends of the guide rods 85 so that it is coaxial with the outer wheel 62. Brake drum 95 is adapted to contact and frictionally engage the complementary brake shoe formed by the brake lining 96 mounted on the frustoconical portion 97 of the outer web wheel 62. The outer brake drum 95 and shoe are forced into contact with each other by the hydraulic force transmitted from the hydraulic pistons 90, transmitted through the inner brake shoe 78, the inner brake drum 82, and the guide rods 85 to the outer brake drum 95.

Figure 4:
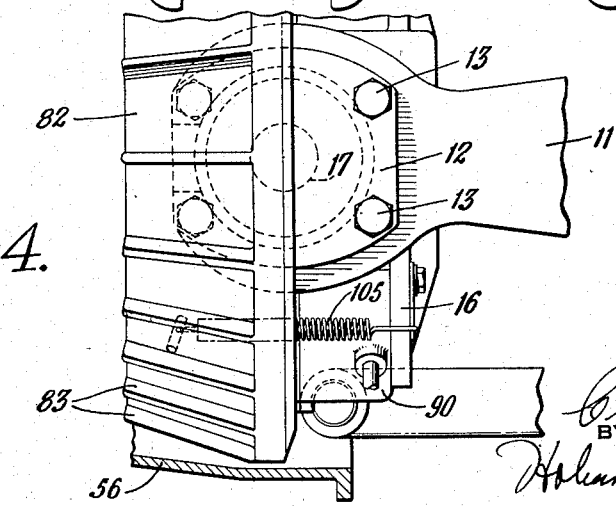
Fig. 4 is a fragmentary detail view of a portion of the inner wheel brake, the outer wheel being broken away.

Means are provided for disengaging the brake drum 82 from its brake shoe 78, and for this purpose springs move the brake drum 82 until the brake drum 95 is lightly in contact with its brake shoe 97. These springs comprise coil springs 100 mounted in recesses 101 formed in the brake drum 95 and aligned recesses 102 in the wheel web 55. Other means are provided for retracting the brake shoe 78 when the hydraulic pressure on piston 91 is relieved and comprises the tension springs 105 (Fig. 4) each having one end connected to the brake shoe 78 and its other end connected to the sleeve member 16.

Figure 5:
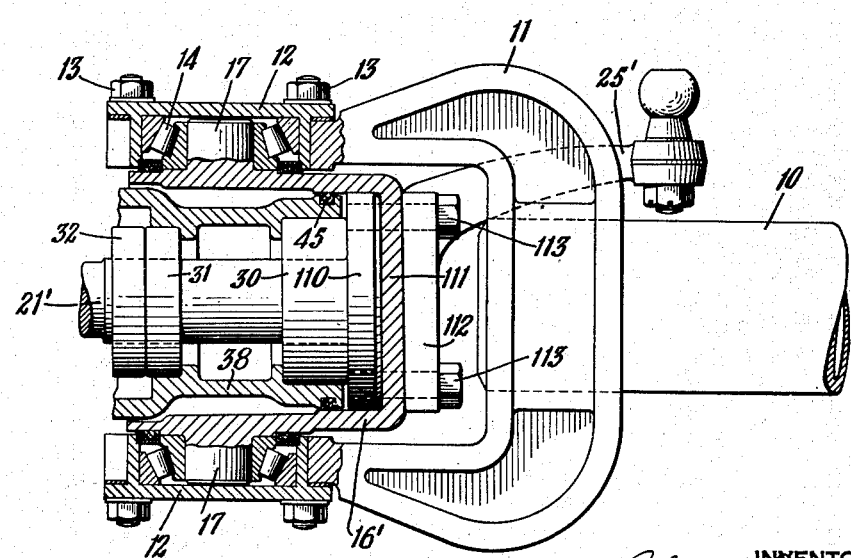
Fig. 5 is a detail sectional view of a modified embodiment of the present invention.

Fig. 5 of the drawings illustrates a modified embodiment of the wheel assembly, and in many respects the parts are duplicates of those already described. In this embodiment the spindle 21' is provided at its inner end with an integral outwardly extending flange 110 which is fitted into sleeve 16' and against the integral closing member or plate 111 of the sleeve. The steering arm 25' is provided at its end with a flange 112 to be fitted to plate 111, and the spindle and steering arm are held to the sleeve by stud bolts 113 extending from flange 110 through plate 111 and through flange 112, whereby the parts are securely assembled and dirigible movement of the spindle and sleeve effected.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel construction comprising, in combination, a sleeve, a non-rotatable spindle within the sleeve, a vertical pivot for dirigible movement of the sleeve and spindle, a dished wheel overlying the vertical axis of the pivot, a hub for the wheel rotatably mounted on the spindle having bearing support by spindle on either side of the vertical axis of the pivot, a second hub rotatably mounted on the spindle beside the first hub, and a wheel for the second hub.

2. A dual wheel construction comprising, in combination, a sleeve, a non-rotatable spindle extending axially of the sleeve having a portion within the sleeve and a portion extending out of the sleeve, a vertical pivot for dirigible movement of the sleeve and spindle, a pair of spaced apart bearings on the spindle within the sleeve one on either side of the vertical axis of said pivot, a dished wheel rotatably mounted on the bearings, and another wheel rotatably mounted on the portion of the spindle extending out of the sleeve.

3. A dual wheel construction comprising, in combination, a non-rotatable spindle, a sleeve enclosing substantially half the length of the spindle, a vertical pivot for dirigible movement of the sleeve and spindle, a pair of spaced apart bearings on the spindle within the sleeve one on either side of the axis of said pivot, a wheel rotatably mounted on said bearings said wheel being deeply dished to overlie the axis of said pivot, and another wheel rotatably mounted on the spindle beside said bearings.

4. A duel wheel construction comprising, in combination, a sleeve, a spindle secured to an end of the sleeve and extending the length of and out of the sleeve, a vertical pivot on the sleeve for dirigible movement thereof, bearing means on the spindle lying in either side of the vertical axis of said pivot, a dished wheel rotatably mounted on the bearing means and overlying said pivot, and another wheel rotatably mounted on the end of the spindle extending out of the sleeve.

5. A duel wheel construction comprising, in combination, a sleeve, a spindle non-rotatably mounted in the sleeve, a vertical pivot for dirigible movement of the sleeve and spindle, two pairs of spaced apart bearings on the spindle one bearing of each pair being positioned closely adjacent a bearing of the other pair, and a pair of wheel hubs each rotatably mounted on a respective pair of bearings, one of said hubs having a portion overlapping and journalled on the other hub, said overlapping portion being adjacent said adjacent bearings.

6. A duel wheel construction comprising, in combination, a sleeve, a spindle non-rotatably mounted in the sleeve, a vertical pivot for dirigible movement of the sleeve and spindle, a first pair of spaced apart bearings on the spindle having one bearing on either side of the vertical axis of the vertical pivot, a second pair of bearings on the spindle one bearing of said pair being positioned closely adjacent a bearing of the first pair, a pair of wheel hubs each mounted on a respective pair of bearings one hub having a portion overlapping and journalled on a portion of the other hub, a dished wheel on the first hub overlying the vertical axis of the vertical pivot, and another wheel on the second hub.

7. A dual wheel construction comprising, in combination, a sleeve, a spindle non-rotatably mounted in the sleeve, a vertical pivot for dirigible movement of the sleeve and spindle, a wheel hub rotatably mounted on the spindle within the sleeve having bearing support by the spindle on either side of the vertical axis of the vertical pivot, another wheel hub rotatably mounted on the spindle beside the first hub, a dished wheel on the first hub overlying the vertical axis of the vertical pivot, a second wheel on the second hub said wheel having a portion near its outer periphery closely adjacent a portion of the dished wheel, and sealing means between the adjacent portion of the wheels whereby the space between the wheels is sealed off.

8. A dual wheel construction comprising, in combination, a sleeve, a spindle non-rotatably mounted within the sleeve, a vertical pivot for dirigible movement of the sleeve and spindle, a wheel hub rotatable mounted on the spindle within the sleeve having bearing support by the spindle on either side of the vertical axis of the vertical pivot, another wheel hub rotatably mounted on the spindle beside the first hub, a dished wheel web on the first hub overlying the vertical axis of the vertical pivot, a second wheel web on the second hub having a portion near its outer periphery closely adjacent a portion of the dished wheel, sealing means between the adjacent portions of the wheels, and braking means for each wheel including brake shoe and brake drum members for the second wheel web between the dished and second wheel webs, said members being of lesser diameter than said adjacent portions of the wheel webs.

CHARLES S. ASH.